May 13, 1947.                J. N. PAQUIN                2,420,617
                                FITTING
                        Filed April 27, 1943          3 Sheets-Sheet 1
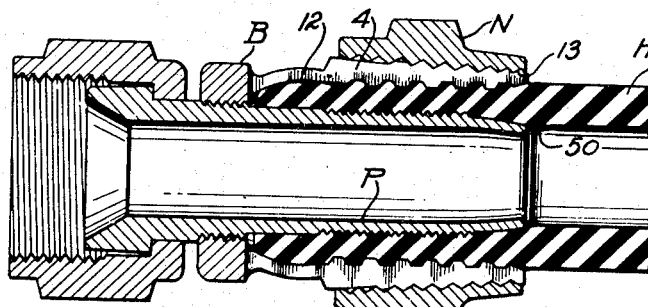
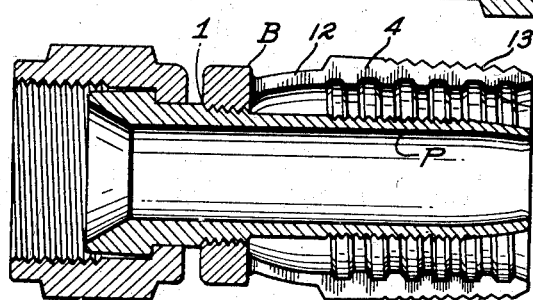
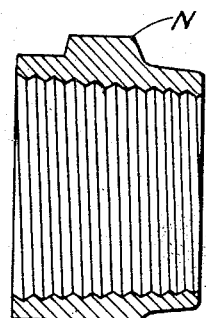
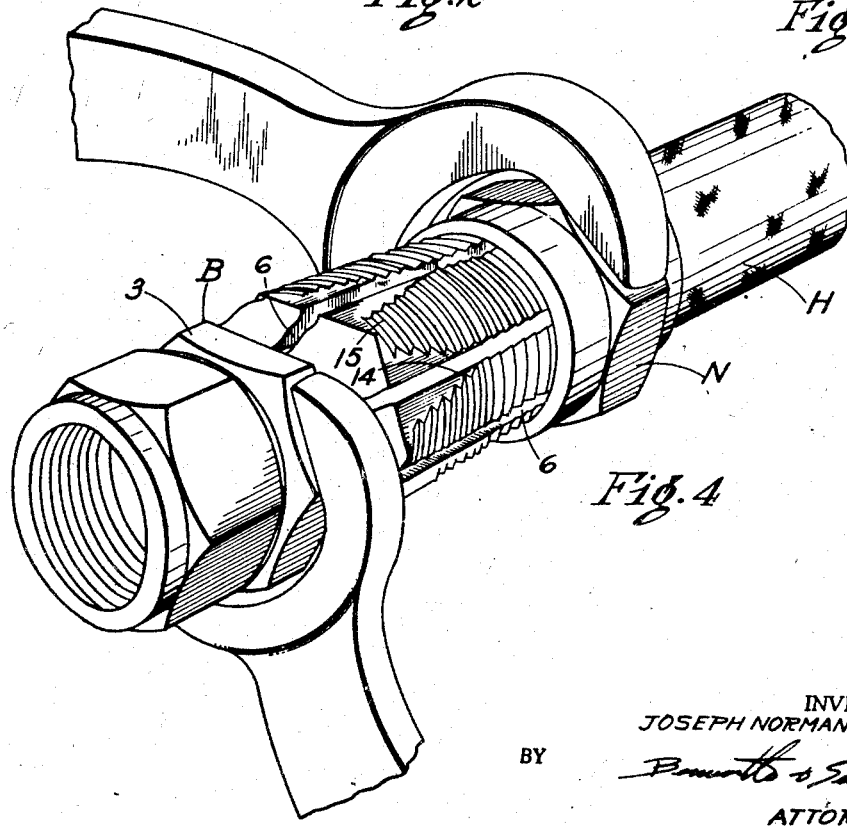
INVENTOR.
JOSEPH NORMAN PAQUIN
BY
ATTORNEYS May 13, 1947. J. N. PAQUIN 2,420,617
FITTING
Filed April 27, 1943 3 Sheets-Sheet 2
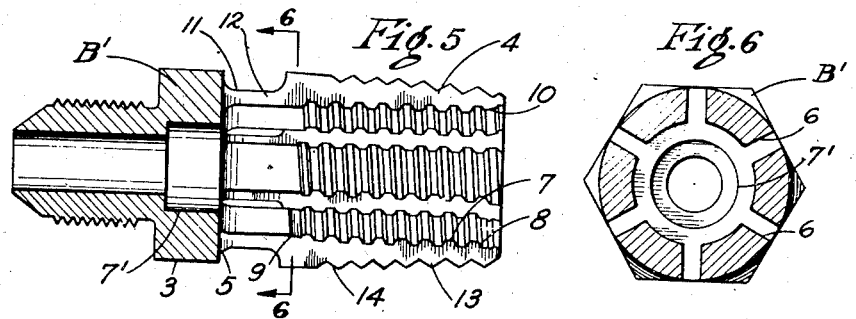
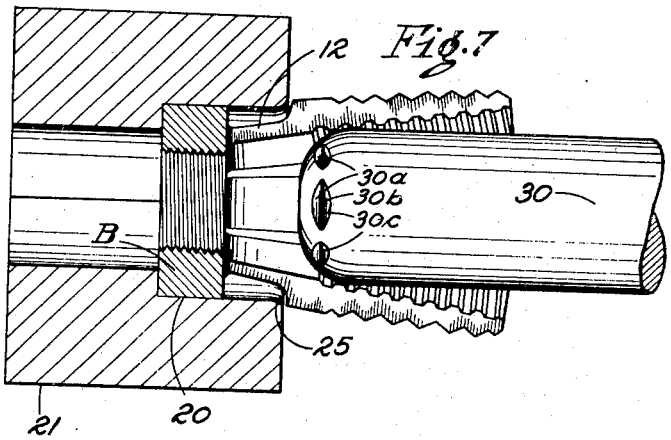
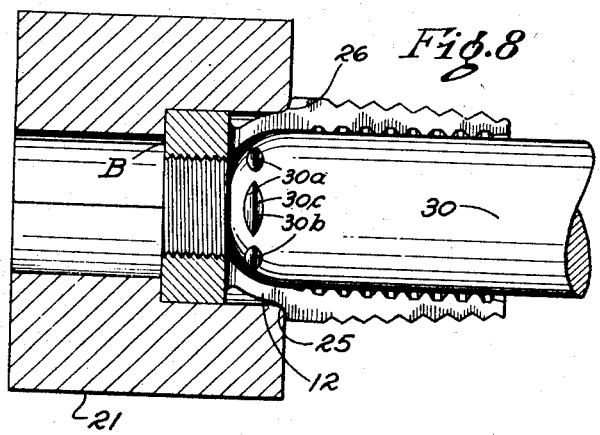
INVENTOR.
JOSEPH NORMAN PAQUIN
BY
ATTORNEYS May 13, 1947. J. N. PAQUIN 2,420,617
FITTING
Filed April 27, 1943 3 Sheets-Sheet 3

INVENTOR.
JOSEPH NORMAN PAQUIN

BY
ATTORNEYS

Patented May 13, 1947

2,420,617

UNITED STATES PATENT OFFICE 2,420,617

FITTING

Joseph Norman Paquin, Euclid, Ohio, assignor to The Weatherhead Company, Cleveland, Ohio, a corporation of Ohio Application April 27, 1943, Serial No. 484,731

12 Claims. (Cl. 285—84)

This invention relates to hose end fittings and more particularly to the type called quick attachable, that is, the type in which the fitting may be attached to or removed from the end of a rubber or other flexible hose manually or with the aid of manually wielded tools such as hand wrenches. Although my invention is particularly adapted to fittings of this type, one or more features, methods or combinations hereof to be presently and more fully described are not lacking in utility and advantage in fittings of the more permanent type as distinguished from the so-called quick attachable type.

It is among the objects of my invention to provide a fitting for the end of a flexible hose such as a combined rubber, plastic or synthetic rubber and/or fabric or wire braid reinforced hose which can be readily and repeatedly attached to and removed from the hose end without impairing its utility or efficiency, and which will endure high fluid pressures and great mechanical stresses. Another object is to provide a fitting that will be useful in a wide range of sizes and will accommodate substantial deviations from the original or expected or intended size of the hoses to which it is to be attached and secured. Hoses with which my fitting may be employed differ in their composition, structure, reinforcements, coverings and the like and it is among the objects of my invention to provide a hose end fitting which is adaptable to engage and perform its duties and functions with a wide variety of different types of flexible hoses, tubes and conduits.

One of the problems with which this art has been long confronted is that of providing a hose end fitting which in its attachment to a hose does not increase the resistance to the flow of fluid through the hose and the fitting or either of them or the assembly thereof. It is among the objects of my invention to provide a fitting which when assembled with the hose and secured thereto in its operative relation will afford but a minimum line loss or fluid pressure drop to the fluid flowing through the assembled and coupled members.

Another problem long standing in the art presents itself in the form of the means required to affect the attachment of the so-called quick attachable fitting to the end of the hose. Various of the so-called quick attachable fittings have required the use of separate fixtures, mandrels, wrenches, jigs and tools. It is among the objects of my invention to provide a hose end fitting which is more truly quick attachable in the sense that the parts may be readily assembled and satisfactorily connected with the use of merely the human hands and ordinary wrenches or simple hand tools and without special equipment, fixtures, mandrels and the like.

Another problem in the art has lain in the multiplicity of loosely associated parts or portions of the fitting structure particularly in fittings of the segmental type in that often each of the several segments has been entirely free or disconnected from each of the other segments other than when engaged in gripping the hose. This type of fitting presents the difficulty of the loss or misplacement of parts and the especial awkwardness of assembling the parts in the right relation one to the other to comprise a usable article at the time and place where the same was sought to be used. It is among the objects of my invention to avoid such hazards.

Another problem to the solution of which my invention is addressed is that of economy of time, cost and material both in the manufacture of the fitting and in its finished form in relation to its ultimate strength with respect to the hydraulic and mechanical loads imposed upon it. Another object is to provide a fitting which will be economical of hose, both in respect to the wear and tear on the hose and in respect to the size and cost of the hose.

Other objects include the provision of methods or processes of manufacture of the fitting for carrying out the above objects and for effecting various of the savings and advantages presently to appear.

These and other objects will become more fully apparent from the following description of a preferred and certain modified forms of my invention, reference being had to the accompanying drawing in which Fig. 1 is a longitudinal section taken through the assembled hose end and fitting, in which the fitting is of the swivel end type.

Fig. 2 is a longitudinal section through an assembly of the body or sleeve of the fitting with the nipple thereof and associated parts in position ready to receive the hose end and prior to engagement therewith.

Fig. 3 is a longitudinal section through the internally threaded nut part of the fitting.

Fig. 4 is a perspective view of the fitting and hose end with wrenches shown in engaging relation to the parts during the time of gripping the hose end in the fitting.

Fig. 5 is a longitudinal section of an externally modified form of body member in a stage of its manufacture appropriate to both forms prior to the enlargement of the hose gripping parts or segments.

Fig. 6 is a transverse section taken along the lines 6—6 of Fig. 5.

Fig. 7 is a longitudinal section illustrating a step in the method of expanding the hose gripping parts or segments.

Fig. 8 shows a further step in the expansion and forming of the body part of the fitting.

Figure 9:
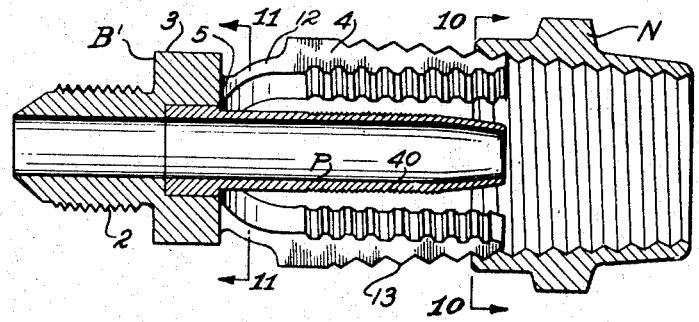
Fig. 9 is a longitudinal section of the fitting parts shown in Figs. 5 to 8 in the absence of the hose to be coupled in the initial relation of assembly for gripping action.

In the drawings, compare Figs. 2, 3 and 9, I have illustrated two forms each of which embodies my invention in the same way, and differ merely in extrinsic or collateral matters. The form in Figs. 2 and 3 have, as shown at the left of Fig. 2, a female swivel fitting for attachment to a complementary device, and the form of Fig. 9 includes a simple male thread and S. A. E. terminus for a similar purpose. My invention or inventions are essentially concerned with the parts which coact with or engage the hose end and in the methods of making those parts.

As shown in Figs. 1 and 4 my fitting comprises a body or sleeve B engaging the end of the hose H exteriorly, a nut N encompassing the body, and a standpipe or nipple P engaging the end of the hose H interiorly. In the form of Figs. 1 and 2 the body B is conveniently threaded onto the nipple P as at 1 in firm engagement therewith, and the left end of the nipple as viewed in Fig. 2 supports and comprises the swivel fitting mentioned above with which the instant inventions are not per se concerned. In the form of Fig. 9 the body B' conveniently includes as an integral part the externally threaded part shown at the left of the figure with which we are not concerned except insofar as the body adjacent this part receives the end of the nipple, preferably in a brazed fluid tight fit as at 2.

Figures 10, 11:
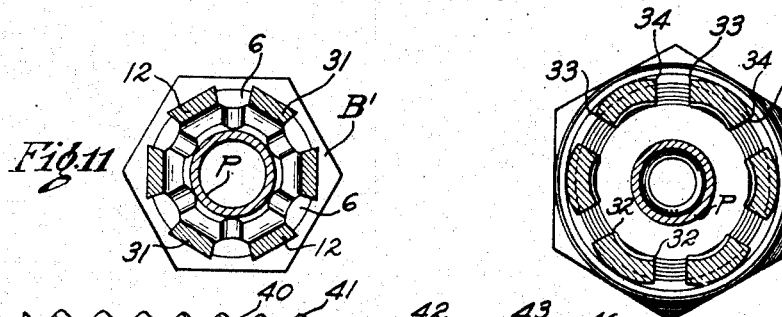
Fig. 10 is a transverse section taken along the line 10—10 of Fig. 9.
Fig. 11 is a transverse section taken along the line 11 of Fig. 9.

Germane to the instant inventions, in all the forms illustrated, the body B of Figs. 1, 2 and 4 and the body B' of Figs. 5, 9, etc., comprise essentially a head preferably of noncircular, such as hexagonal form, see Fig. 6, from which extend longitudinally disposed segments 4 preferably formed integrally, or joined to and acting integrally, with the head 3 and joined thereto as at 5. As shown in Figs. 4, 6 and 10 the segments are separated one from the other by longitudinal slots 6, preferably extending substantially all the way from the open end of the bodies B and B' to the head 3. For reasons presently to be described and as shown best in Fig. 4, I prefer that the slots 6 be located to lie in planes which intersect the middle of the flats of the hex. I prefer also as shown in Fig. 4, that the segments be equal in number to the number of polygonal faces of the head 3. I prefer also that the number of segments be relatively great, such as six segments for a hose of ¾" outside diameter, so that they may have relative freedom of movement.

Taking the hexagonal form of the body as illustrative, I take a length of hexagonal stock equalling substantially the length of the bodies B or B', which preferably corresponds to the size and shape of the head 3 in its external form as shown in Fig. 6. Thereafter a central cavity 7, see Fig. 6, is drilled or bored out and a central coaxial bore 7' of smaller diameter is extended into the head 3, the latter to be left in the form of Fig. 5 and receive the end of the nipple as shown in Fig. 9, or to be threaded to receive the corresponding part of the nipple as shown in Figs. 1 and 2. After forming the bore 7 the same may be threaded internally, preferably with flat shallow type threads 8 of substantially constant diameter for the larger portion of the depth of the bore except where the threads naturally run out as at 9 and except where the surface to be threaded is tapered or chamfered outwardly near the open end of the bore as at 10. Although I prefer to provide internal threads as at 8 as just mentioned, I have found in practice that the fitting if left unthreaded internally will give satisfactory results, particularly where the external surface of the hose to be gripped thereby is rubber or rubber-like in its consistency. The external surfaces of the body are turned or formed as at 11 to produce a neck portion 12, see Fig. 5, of reduced thickness. The remaining outer external portions of the body are threaded with external tapering threads 13 which tend to run out on the flats of the hex as at 14, see also Fig. 6, but are at full depth for a greater distance in the zone of the peaks of the hex as at 15, see also Fig. 4. These external threads 13 are tapered preferably at an angle from about 4° to 7° from the axis of the body, increasing in diameter away from the open end thereof. Preferably these threads are formed with the sloping walls thereof including an angle of about 120° to afford flatter areas to support radial pressures incident to gripping the hose, reduce friction and save wall thickness both in the nut and body parts. The angle of taper of the threads 13 is preferably selected with regard to the character and wall thickness of the hose end to be gripped; thinner and harder walls being more advantageously gripped with a flatter taper in the threads 13, and softer and thicker walls tending to react more favorably to a steeper taper.

After the bodies have been threaded internally and externally and otherwise formed as above described, I then as a next step in a preferred order of operation cut the slots 6, see Figs. 4 and 6, thereby bringing about the relative independence of each of the segments 4 from the other, except as the same are joined to the head 3 through the correspondingly severed portions of the neck 12. As shown particularly in Fig. 5 each of the segments 4 comprises a main threaded portion of increasing thickness from the open end of the body and the neck portion 12.

At this stage in the formation of the bodies B and B', the formation of which may be carried out by identical steps as above described and as about to be described, the internal diameter of the bore 7 is preferably considerably smaller than the external diameter of the hose H which is intended to be gripped. Thus I have employed stock of smaller size for the instant purpose than is otherwise taught in the art, and I have consequently threaded and machined smaller surfaces on the smaller diameters in the smaller size stock, all saving time, material, tools, scrap and the like. Since the hose is to be received within the segmental parts of the body I next proceed to enlarge those parts radially, compare Fig. 6 and Fig. 10, to open up the segmental part of the body to its desired size and to the form presently to be described.

Referring now more particularly to Figs. 7 and 8, I take the body, either B or B', the body B here being particularly illustrated, and place the head 3 in the counterbored portion 20 of a split female die 21. The die member 21 also has a shoulder, preferably rounded in the radial plane as viewed in Fig. 7 as at 25 against which the outer ends of the necks 12 are ultimately forced into contact as at 26 see Fig. 8. After the body is located in the female die above described a punch or male die member 30 having a suitably rounded nose is forcibly caused to enter the open end of the body among the theretofore severed segments thereof, expanding the segments during its inward passage toward the head of the body as shown in Fig. 7. Initial movement of the punch 30 into the body causes the segments 4 to be splayed outwardly as shown, and continued motion of the punch 30 into the neck portions 12 of the segments 4 brings the nose of the punch into forcible contact with the necks 12 causing them to be curved abruptly as shown in Fig. 8 by virtue of the contact between the nose of the punch 30 with the necks 12 inwardly of the shoulder 25. This force and motion causes the necks 12 to swing the segments 4 back to the position shown in Fig. 8 in which the threaded portions of the segments are returned to positions substantially parallel to the axis of the body as shown in Figs. 2, 8 and 9, but spaced farther apart from each other both diametrically and circumferentially. As a result of this expansion of the segmental parts of the body the internal diameter of the segmental zone thereof is increased, compare Figs. 6 and 10, to receive a hose whose external diameter is larger than the original diameter of the bore 7 as shown in Fig. 5.

In the bodies formed as above described it will be seen that each of the segments 4 is attached to the head 3 through the neck portions 12 of reduced radial thickness and is relatively free to be swung inwardly into compression upon the outer surfaces of the host to be coupled, each segment swinging on the neck portions 12, the neck portions acting more or less like strap hinges, or links pivoting in opposite directions about spaced axes or zones, for the several segments. Each of the neck portions however has the full arcuate or circumferential width of the segments and thus resists hinge-like movement of the segments relative to the head circumferentially, whereby the segments are relatively free to move radially but are restrained in their circumferential movement. The body as a whole is thus strong in torsion to take the loads imposed upon it under the influence of such instrumentalities as the wrenches illustrated in Fig. 4. The neck-like portions 12 also are stout enough, however, to take a full share of the strains of tension, compression, bending and shear developed in either the gripping of the hose or the use of the assembled product, and are able to stand up under sepeated attachments and detachments to and from hose ends.

In the bodies as thus far described the necks 12 would be of arcuate configuration in transverse cross-section, as viewed in Fig. 6 for example, if the nose of the punch 30 and the shoulders 25 of the die member 21 did not otherwise influence them. In many instances, using softer or more ductile materials for the bodies, I find this arcuate configuration of the necks 12 to be satisfactory but it may well be desirable when using harder or less ductile materials that these necks be flattened at least in transverse section in their mid portions as shown in Fig. 11 to give somewhat more flexibility to facilitate repeated hinge-like motion of the segments radially inward and outward toward and from the axis of the body without jeopardy of fracture. Similarly the number, size, depth and degree of curvature of the necks 12 will enter into stiffness of the necks, and my teaching is to so construct the necks as to preserve the "strap hinge" flexibility above mentioned and permit satisfactory ease of radial movement of the segments, as distinguished from arcuate movements, at least under the influence of the nut N. Preferably the flattening of the mid-portions of the necks as shown in Fig. 11 is accomplished by the use of a faceted punch or male die 20 having facets 30a and 30b intersecting in spaced hexagonal lines 30c entering a complementarily formed female die 21, the former entering the neck-line portions of the segments and the latter supporting the externally opposite portions thereof to give the mid-portions of the necks the relatively straight transverse configuration as shown at 31 in Fig. 11.

The threaded portions of the segments 4 were as described above in reference to Figs. 5 and 6 formed with the radii of the threads corresponding to the taps and dies conforming to the initial smaller diameters. After the segments have been expanded, i. e., separated from each other in the steps of Figs. 7 and 8, the radii of the threads in each segment will be smaller than the radii of the circles that touch corresponding high points of each segment. Since the high points, i. e., mid-portions of the threads on each of the expanded and separated segments lie in arcs of circles of greater radius than the arcs of the segments and segmental threads as shown in Fig. 10, the transverse ends of the threads on each segment as at 33 and 34 lie radially inward from the mid-portions of the threads of each segment and tend to stay out of contact with the threads of the nut N as the nut advances over the threads of the segments. Thus the ends of the threads of the segments are restrained from scoring the threads of the nut.

To facilitate the entry of the hose into the segmental portions of the body, I prefer to round or smooth off the inner corners of minimum radii of each of the segments as at 32. This is preferred so that the hose will not tend to be scored or scratched on its external surfaces during entry to or removal from the body.

The nut N see Figs. 1, 8, 9 and 10 may conveniently have an externally hexagonal configuration or other polygonal or non-circular external form as shown, and is preferably of the length substantially conforming to the length of the external threaded parts of the segments 4. Internally the nut is threaded with a tapered thread tapering preferably about 1° steeper than the taper of the complementary threads of the segments. The internal threads of the nut are complementary to the threads of the segments preferably having substantially the same form and lead, and the pitch diameters corresponding to the pitch diameters of the outermost portions, i. e., high points, of the threads of the segments midway between the points 33 and 34, see Fig. 10. The greatest pitch diameters of the threads of the nut are such as to engage the first few threads of the segments in their expanded form, see Fig. 9, and then as the nut is advanced over the segments, the segments are forced to move radially inward so that for "normal" or median size hose ends the movement of the nut over the segments will affect the desired compression of the hose when substantially all of the threads of the nut and the segments are fully engaged as shown in Fig. 1. Departures in tolerances from "normal" hose sizes merely cause the nut to come "home" on the segments a turn or so more or less from the positions shown in Fig. 1.

As the nut advances on the segments, compressing the hose end, the segments are moved inward radially, as distinguished from arcuately, and the slots 6 between the segments are narrowed and the transverse curvature of the segments again approaches the curvature of the circles of progressively smaller diameter in which they are forced to lie. This means that greater threaded bearing areas are produced between the threads of the nut and the threads of the segments as the load and pressure between those threads is increased and as the hose end is compressed so that the cooperating parts tend to be self compensating in their assumption of load while the grip upon the hose is increased.

The inner corners 32 of each of the segments first engage the outer surface of the hose as the segments are forced inwardly by the nut, and tend to press into that surface along axially extending parallel lines or grooves. In this way, the segments tend to sustain themselves in axial alignment, being restrained from moving into helical relation to the axis of the coupling under the torsional influence of the nut. This tends to relieve the necks of torsional strain and permits the development of a strong grip on the hose without sacrifice of the desired hinge-like flexibility of the necks 12 in their support of the segments for relatively free movement toward and away from the axis of the fitting. The ease with which the segments may move radially, except as resisted by compression of the hose, taken with the flatness of the external threads 13 and the corresponding flatness of the threads in the nut N, permits the nut to be snapped onto the first thread or so of the segments aiding the speed of assembly of the parts. This springiness of the segments with the flattened threads reduces the difficulties of cross threading since any cross-threaded part is relatively free to yield and snap back into its proper relation.

As shown, the fitting as a whole includes a nipple entering the interior of the end of the hose to support the walls while the exterior is exposed to the compression of the inward movement of the segments 4. Various forms of nipples known in the art would have utility in combination with the nut and body above described, so long as they did not materially detract from the functions and mode of operation of the nut and body, but for reasons presently to appear, I prefer to employ the nipple P hereinafter particularly described to gain the best results now known to me.

In fittings of the quick attachable and other types it has been common practice to make the outside diameter of the nipple enough greater than the inside diameter of the hose to cause the walls of the hose to be stretched materially and correspondingly reduced in wall thickness whereby to lessen relatively the burden of gripping force and movement of the outer gripping means incident to attaching the fitting to the hose end. The present state and trend of the art contemplates the use of flexible rubber-like or rubber hoses of much tougher material, greater wall thickness, reinforcements and otherwise to withstand high mechanical and hydraulic pressures and stresses. It thus becomes disadvantageous, if not impracticable, to force the hose end over a nipple of relatively large outside diameter by only ordinary human hands or simple manual means. Moreover, even if the modern high pressure hose ends were forced over nipples of great exterior diameter, relative to the inside diameter of the hose, there would be a correspondingly great tendency to roll up or crowd in front of the open end of the nipple an inwardly extending annular wave or ring of the rubber or rubber-like lining of the interior of the hose. In extreme cases this might completely or substantially obstruct the passage. It is of course possible as the art has often taught to reduce the outside diameter of the nipple at the expense of the inside diameter and while this tends to relieve the difficulty of rolling up a constriction in the lining of the hose, the reduced interior diameter of the nipple itself affords an undesirable restriction to the flow of fluid through the assembly of hose end fitting.

To escape these dilemmas I have provided the nipple P, which as shown particularly in Fig. 1, extends into the inside of the hose H with its inner end substantially in the radial plane of the ends of the segments 4, and has the major portions of its interior diameter substantially equal to the interior diameter of the hose. The walls of the nipple that lie within the hose are as thin as practicable considering the strength of the material employed, whether for example, steel on the one hand or aluminum on the other, to fairly support the compressive and other forces exerted thereupon through the walls of the hose while the hose is gripped by the segments 4 and otherwise stressed in use. Externally the nipple is preferably threaded as at 40 with small shallow round top and bottom V-threads from a point near the end thereof back to about the zone of the necks 12 of the body. I prefer to employ quadruple or other suitable multiple threads on the exterior of the nipple when the interior of the segments are threaded so that the lead thereof will be substantially the same as the lead of the interior threads 8 of the segments 4, and/or to facilitate rapid longitudinal motion of the hose relative to the nipple per turn of the hose during assembly. In this way when the hose is forced, i. e., screwed, into the fitting it is carried forward by rotation relative to the nipple and body of the fitting in the same way. The nose of the nipple as shown in its finished form in Figs. 11 and 13 is bluntly rounded, and the extreme open end thereof is reduced in diameter to the extent that its minimum outside diameter is substantially the same as the inside diameter of the hose it is intended to enter.

Figure 12:
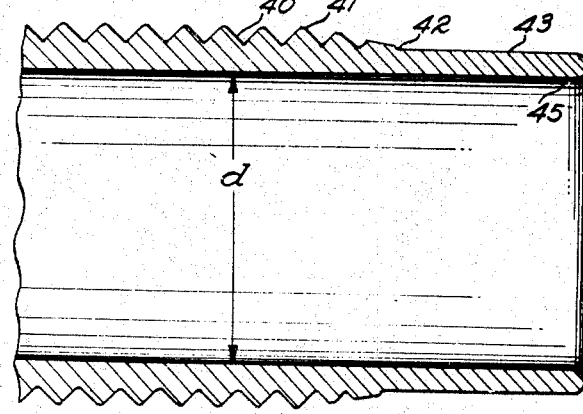
Fig. 12 illustrates in a fragmentary enlarged view the forward or entering end of the nipple or standpipe in an initial stage of its manufacture.
Figure 13:
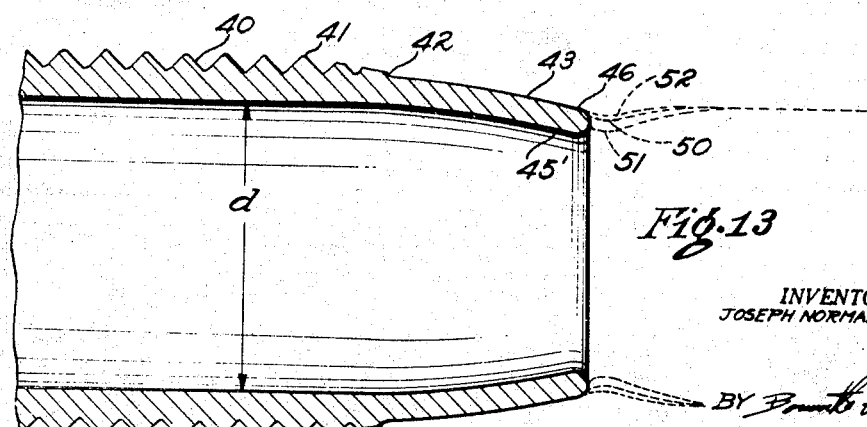
Fig. 13 illustrates similarly the nipple in its finished form.

As shown in Figs. 12 and 13 the parts entering the end of the hose are preferably first formed as shown in Fig. 12 with the exterior surface threaded as above described and preferably tapered from about the point 41 where the threads begin at full depth to about the point 42 where the threads tend to run out leaving a smooth surface 43 between the forwardmost partial thread and the extreme front end of the nipple. The extreme front end of the nipple is rounded as at 44. Internally the front end may have a straight bore, or a slight outward chamfer, not shown, as at 45. Thereafter the front or open end of the nipple comprising the smooth outer surface 43, along with the rounded end 44 and the inner surface 45, is spun or crimped inwardly, see Fig. 13, to curve the exterior surface 43 to the form shown at 43' and to modify the inner surface 45 to the curve 45' as shown in Fig. 13. During this operation the end 44 is correspondingly reduced in diameter preferably to permit the point 46 to lie just within the internal diameter of the hose, i. e., substantially within the internal diameter $d$ of the nipple. The bluntness of the rounding of the nose of the nipple is preferably such that the distance from point 42 to the extreme end 44 is about ½ $d$. The constriction at the end of the nipple within the surface 45' is only a small fraction of the inside diameter of the nipple, that is, the minimum diameter of the annular surface 45' where it joins the rounded end 44, may be of the order from about 90 to 95% of the full inside diameter $d$ of the nipple depending in part on the size of the hose, its wall thickness and the relative "fluidity" of the material of the lining of the hose.

As shown in Figs. 1, 2 and 9, I prefer that the end 44 of the nipple P lie in substantially the radial plane of the open end of the body B, i. e., radially opposite the ends of the segments 4. I have found that the nipple of such length is long enough to enter the hose handily and is short enough to permit the inside surface of the hose to bulge inwardly a little as at 50, 51 and 52, see Figs. 1 and 13 in response to the squeeze of the segments 4 thereupon as the nut induces their grip upon the outer surface of the hose end. Whether the inward annular bulge of the inner surface of the hose be as much as indicated at 51, or as little as indicated at 52, or therebetween as indicated at 50, the form of this bulge tends to complement the adjacent surfaces 44 and 45' of the nipple, giving a rounded Venturi-like configuration to the conjoint surfaces 45' and 50, or 51 or 52, with the result that line friction losses are very small at this point. Since the internal diameter $d$ of the nipple is substantially equal to the inside diameter of the hose, line losses incurred from small inside diameter nipples are avoided, and the result is that the net fluid pressure drop in and incident to the fitting is held within very small amounts.

Because the segments 4 of my fitting may be expanded outwardly substantially as far as may be desired while receiving the hose, the hose is not externally restrained against the modest expansion thereof which is required as the nipple is forced thereinto. Similarly because of the great facility of radial movement obtainable in the segments 4 as constructed in the body of my fitting substantially all the desired gripping action may be had upon the inward and relatively large movement of the segments under the influence of the nut N. In rounding the end of the nipple and making it relatively blunt in contrast to the knife edge formations commonly found in nipples of the prior art there is no tendency for the end of the nipple to score or cut or get a cutting grip on the interior surface of the hose.

In Figs. 12 and 13 I have illustrated merely portions of the nipple which extend within the end of the hose. The more rearward portions of the nipple, whether in the form shown in Figs. 1 and 2 on the one hand, or Fig. 9 on the other hand in their relation to and attachment with the body B are capable of taking various desirable forms without modifying or impairing the objects and advantages of the parts here particularly discussed. A wide range of choice of materials is open for use in my invention; such a combination as a steel nipple with an aluminum alloy body would illustrate a desirable choice.

In choosing the exact length of the nipple relative to the length of the body it will be understood that this relation may be advantageously modified within reasonable limits, having in mind, for example, that where the lining of the hose is relatively thick and soft and the tendency of the hose to bulge inwardly is great, that the nipple may be lengthened relative to the length of the body, preferably enough to keep the bulge from substantially exceeding the contour 51 as shown in Fig. 13. Similarly for harder and thinner linings the nipple may be advantageously shortened a little so as to bring about a bulge, preferably no smaller than that shown at 52. In all events the bluntly rounded end of the nipple with the large internal diameter relative to the inside diameter of the hose permits ready assembly of the parts, reduces line losses to a minimum, requires but little expansion of the hose during assembly, and preserves the inside surface of the hose against cutting or ruptures.

Heretofore it has been common practice to employ fittings in which the inside diameter of the nipple was smaller than the inside diameter of the hose but corresponded roughly to the inside diameter of the tubes or pipe lines to which the nipple lead. Thus for a so-called half inch line system it has been common practice to use half inch outside diameter metal tube with one half inch inside diameter hose and with the inside diameter of the nipple and fittings corresponding to the inside diameter of the tubing, as for example at $25/64$ to $13/32$ inches. When high pressures are employed in such systems the hose with its relatively large inside diameter required either stronger reinforcements or thicker walls to withstand the greater disrupting pressures incident to the large inside diameter which required in turn a further increase in outside diameter with a corresponding increase in the size of the bodies of the fittings intended to grip the hose externally. Using the fitting of my invention I may employ hoses with internal diameter substantially as small as the internal diameter of the rest of the line or system which in the above example might well be as little as $13/32$ inch, and because of the venturi effect mentioned above the line loss at the junction of the inner surfaces of the nipple and the hose would be substantially negligible. With the reduction in inside diameter of the hose the wall thickness may be reduced because the gross bursting pressure is reduced, and the outside diameter of the hose will be more than correspondingly reduced. This in turn permits me to use a smaller body for my fitting. All of these things bring about as geometric functions savings in material both of hose and fitting and the corresponding savings in machine work and manufacturing costs. These things of course are additional to the savings in material and manufacturing costs of the body of the fitting per se by virtue of my novel method of making same as hereinabove described.

While I have illustrated and described preferred forms of my invention, it will be understood by those skilled in the art that various variations, improvements and modifications therein may be made and enjoyed without departing from the spirit or precepts thereof, and I do not, therefore, wish to be limited to the particular or preferred forms or steps or in any manner other than by the claims appended hereto.

I claim:

1. A hose end fitting comprising a body within which a hose end is received and gripped, and a nut cooperating with said body to bring about the gripping of said hose end, said body comprising a head and integrally acting segments extending axially away from said head and disassociated from each other other than through said head, each segment comprising a threaded hose gripping part and a yielding neck portion of reduced thickness joining said part to said head and supporting said part for restrained freedom of bodily radial movement, said nut having direct threaded engagement with said segments remote from said head and beyond said reduced neck portions.

2. A hose end fitting comprising a head, a centrally disposed nipple extending from said head into the hose to be coupled, a plurality of segmental members extending from said head parallel with and radially spaced from said nipple and circumferentially spaced from each other, each of said members comprising a neck portion of reduced stiffness integrally connected with said head and a tapered stiffened portion of increasing thickness toward said neck portion and supported by said neck portion for restrained radial motion toward and away from said nipple, each of said tapered portions having external tapered threads and a radially opposite bearing surface engageable with the hose end to be coupled, and a nut having tapered threads engageable with the threads of said members and adapted to force said members inwardly as it is advanced toward said head, at least the tapered stiffened portions of said segmental members having an inside engaging surface curved transversely on an arc of shorter radius than the radius of the external surface of the hose to be gripped.

3. A hose end fitting comprising a body member, a plurality of segmental gripping members extending axially from said body member and spaced circumferentially from each other, means for compressing said gripping members circumferentially to grip the exterior surface of a hose end embraced therein, the inner hose engaging surfaces of said gripping members being curved transversely on arcs of shorter radii than the radius of the external surface of the hose to be gripped.

4. A hose end fitting comprising a body member, a plurality of segmental gripping members extending axially from said body member and spaced circumferentially from each other, said gripping members being bendable inwardly with respect to said body member, the external surfaces of said gripping members being formed with a tapered thread, a nut adapted to be screwed onto said members to bend the same inwardly to grip the surface of a hose end embraced therein, the inner hose engaging surfaces of said gripping members being curved transversely on arcs of shorter radii than the radius of the external surface of the hose to be gripped, and being formed with threads to facilitate the assembly of the hose into said gripping members and to bite into the hose when said gripping members are compressed.

5. A hose end fitting comprising a tubular body member, a sleeve extending from said body member having a plurality of slots extending into the same from its open end, forming a plurality of segments adapted to embrace a hose end to be coupled to said body member, each of said segments including a gripping member and a link of substantially the same width connecting the gripping member to said body member, each of said links being bendable inwardly with respect to said body member, each of said gripping members being bendable outwardly with respect to its associated link, and means for exerting inward pressure on said segments to bend said links inwardly with respect to the body member and bend said gripping members outwardly with respect to said links and force said segments radially inward against a hose end disposed therein.

6. A hose end fitting comprising a tubular body member, a nipple extending axially from said body member adapted to be inserted in a hose end to be coupled to said fitting, a sleeve extending from said body member surrounding and spaced from said nipple, said sleeve having a plurality of slots extending into the same from its open end, forming a plurality of segments adapted to embrace such a hose end, each of said segments including a gripping member and a link of substantially the same width connecting the gripping member to said body member, each of said links being bendable inwardly with respect to said body member, each of said gripping members being bendable outwardly with respect to its associated link, the external surfaces of said gripping members being formed with a tapered thread with its minimum diameter adjacent the free ends of said members, and a nut having a complemental tapering internal thread adapted to be screwed onto said segmental members from the free ends thereof to bend said links inwardly with respect to said body member and bend said gripping members outwardly with respect to said links and force said segments radially inward against a hose end disposed therein.

7. A hose fitting including a compressible sleeve adapted to surround a hose to be gripped, the external surface of said sleeve including a portion tapering in diameter in an axial direction and formed with an external thread, a nut having a complemental tapering internal thread adapted to be screwed on said portion of said sleeve to compress the same, the said external thread on said sleeve having in longitudinal section, sloping walls arranged at an angle to each other, the sloping wall of said thread adjacent the larger diameter of said sleeve forming an angle with the axis of said sleeve of which the cosine exceeds the sine, so that the radial component of the compressive forces applied thereto by said nut exceeds the axial component thereof, and the sloping wall of said thread adjacent the smaller diameter of said sleeve forming a substantially similar angle with said axis, whereby said nut may be snapped onto said sleeve by relative axial movement of said nut and sleeve.

8. A hose end fitting comprising a tubular body member, a plurality of segmental members extending axially from said body member and adapted to embrace a hose end to be coupled to said body member, each of said segmental members including a gripping portion increasing in thickness from its free end toward said body member and a neck portion joining said gripping portion to said body member, and means for compressing said gripping portions to grip the exterior surface of a hose end embraced therein, each of said neck portions being substantially thinner than the adjacent end of its associated gripping portion, and each of said neck portions flaring outwardly from said body member and each of said gripping portions extending from its neck portion substantially parallel to the axis of said body member when said gripping portions are compressed upon a hose end embraced therein.

9. A hose end fitting comprising a tubular body member, a plurality of segmental members extending axially from said body member and adapted to embrace a hose end to be coupled to said body member, each of said segmental members including a gripping portion increasing in thickness from its free end toward said body member and a neck portion joining said gripping portion to said body member, the external surfaces of said gripping portion being formed with a tapered thread with its minimum diameter adjacent the free ends of said gripping portions, and a nut having a complemental tapering internal thread adapted to be screwed onto said segmental members from the free ends thereof to force said gripping portions inwardly against a hose end disposed therein, each of said neck portions being substantially thinner than the adjacent end of its associated gripping portion, and each of said neck portions flaring outwardly from said body members and each of said gripping portions extending from its neck portion substantially parallel to the axis of said body member when said gripping portions are compressed upon a hose end embraced therein.

10. In combination with a hose, a fitting including a nipple extending into an end of said hose, the outside diameter of said nipple through the major portion of its length exceeding the inside diameter of said hose in unstressed condition, said nipple tapering at its free end to an outside diameter about equal to the inside diameter of said hose in its unstressed condition, the inside diameter of said nipple through said major portion of its length being about equal to the inside diameter of said hose in its unstressed condition, said nipple tapering to a reduced inside diameter at its free end, said hose through a portion of its length adjacent the free end of said nipple tapering to a reduced inside diameter smaller than the inside diameter of said hose in its unstressed condition, the tapering portions of said nipple and the adjacent length of said hose defining a Venturi restriction offering but slight resistance to the flow of fluid therethrough.

11. A hose end fitting comprising a head, a plurality of segments integral with and extending generally axially outwardly from said head, each of said segments including a neck portion integral with said head, said neck portion flaring generally radially from said head as well as extending axially outwardly therefrom, each of said segments also including a generally axially extending hose clamping portion integrally joining the outer end of an associated neck portion, each of said hose clamping portions having external threads, their composite pitch diameter being greatest adjacent said neck portions and decreasing in a direction away from said neck portions, and a nut having complementary tapered threads applied remotely from said neck portions so that as it advances over said segments the neck portions spring and the nut forces said hose clamping portions to move radially inwardly with each element thereof moving radially inwardly substantially the same amount to forcefully and uniformly engage a hose end.

12. A hose end fitting comprising a head, a plurality of segments integral with and extending generally axially outwardly from said head, each of said segments including a neck portion integral with said head, said neck portion flaring generally radially from said head as well as extending axially outwardly therefrom, each of said segments also including a generally axially extending hose clamping portion integrally joining the outer end of an associated neck portion, each of said hose clamping portions having external threads, their composite pitch diameter being greatest adjacent said neck portions and decreasing in a direction away from said neck portions, and a nut having complementary tapered threads applied remotely from said neck portions so that as it advances over said segments the neck portions spring and the nut forces said hose clamping portions to move radially inwardly with each element thereof moving radially inwardly substantially the same amount to forcefully and uniformly engage a hose end, the threads on said segments being curved transversely on arcs of shorter radii than the threads on said nut before said segments are forced radially inward by said nut.

JOSEPH NORMAN PAQUIN.

REFERENCES CITED

The following references are of record in the file of this patent:

UNITED STATES PATENTS

| Number | Name | Date |
| --- | --- | --- |
| 1,509,802 | Weigand | Sept. 23, 1924 |
| 1,293,093 | Hayes | Feb. 4, 1919 |
| 2,314,002 | Lusher | Mar. 16, 1943 |
| 1,468,707 | Johnston | Sept. 25, 1923 |
| 2,319,024 | Wehringer | May 11, 1943 |
| 1,106,542 | Buehmer | Aug. 11, 1914 |
| 2,333,350 | Weatherhead | Nov. 2, 1943 |
| 2,329,281 | MacWilliams et al. | Sept. 14, 1943 |
| 1,038,948 | Patrick | Sept. 17, 1912 |
| 2,034,644 | Walsh | Mar. 17, 1936 |